US011420887B2

(12) United States Patent
Abinet et al.

(10) Patent No.: US 11,420,887 B2
(45) Date of Patent: Aug. 23, 2022

(54) REAL-TIME DEWATERING OPTIMIZATION

(71) Applicant: KEMIRA OYJ, Helsinki (FI)

(72) Inventors: Roderick Abinet, Scottsdale, AZ (US); Greg Land, Yacolt, WA (US); David Soper, Gastonia, NC (US); Tafadzwa Mariga, Arlington, TX (US)

(73) Assignee: KEMIRA OYJ, Helsinki (FI)

( * ) Notice: Subject to any disclaimer, the term of this patent is extended or adjusted under 35 U.S.C. 154(b) by 650 days.

(21) Appl. No.: 15/533,519

(22) PCT Filed: Dec. 10, 2015

(86) PCT No.: PCT/EP2015/079264
§ 371 (c)(1),
(2) Date: Jun. 6, 2017

(87) PCT Pub. No.: WO2016/092022
PCT Pub. Date: Jun. 16, 2016

(65) Prior Publication Data
US 2017/0341958 A1  Nov. 30, 2017

Related U.S. Application Data

(60) Provisional application No. 62/090,426, filed on Dec. 11, 2014.

(30) Foreign Application Priority Data

Dec. 11, 2014  (SE) .................................... 1451523-3

(51) Int. Cl.
C02F 1/52  (2006.01)

(52) U.S. Cl.
CPC .......... *C02F 1/5209* (2013.01); *C02F 1/5236* (2013.01); *C02F 2209/008* (2013.01); *C02F 2209/10* (2013.01)

(58) Field of Classification Search
CPC ........ C02F 1/52; C02F 1/5209; C02F 1/5236; C02F 2209/008; C02F 2209/10
USPC ......................................................... 210/745
See application file for complete search history.

(56) References Cited

U.S. PATENT DOCUMENTS

| | | | |
|---|---|---|---|
| 2007/0175804 A1* | 8/2007 | Kosanda ............ | B01D 21/0012 210/85 |
| 2012/0000859 A1* | 1/2012 | Mitzlaff ................ | C02F 1/5209 210/745 |
| 2013/0240420 A1* | 9/2013 | Robertson ............... | C02F 3/303 210/96.1 |

OTHER PUBLICATIONS

Swedish First Office Action dated Jun. 29, 2015 for Application No. 1451523-3.
International Search Report dated Feb. 10, 2016 for PCT Application No. PCT/EP2015/079264.
Swedish Second Office Action dated Apr. 19, 2017 for Application No. 1451523-3.

* cited by examiner

*Primary Examiner* — Akash K Varma
(74) *Attorney, Agent, or Firm* — Moser Taboada

(57) ABSTRACT

Provided for example is a system and method for real-time monitoring or controlling wastewater or sludge dewatering or thickening processes. The system and method can also enable operators to remotely monitor their own system off-site.

21 Claims, 1 Drawing Sheet

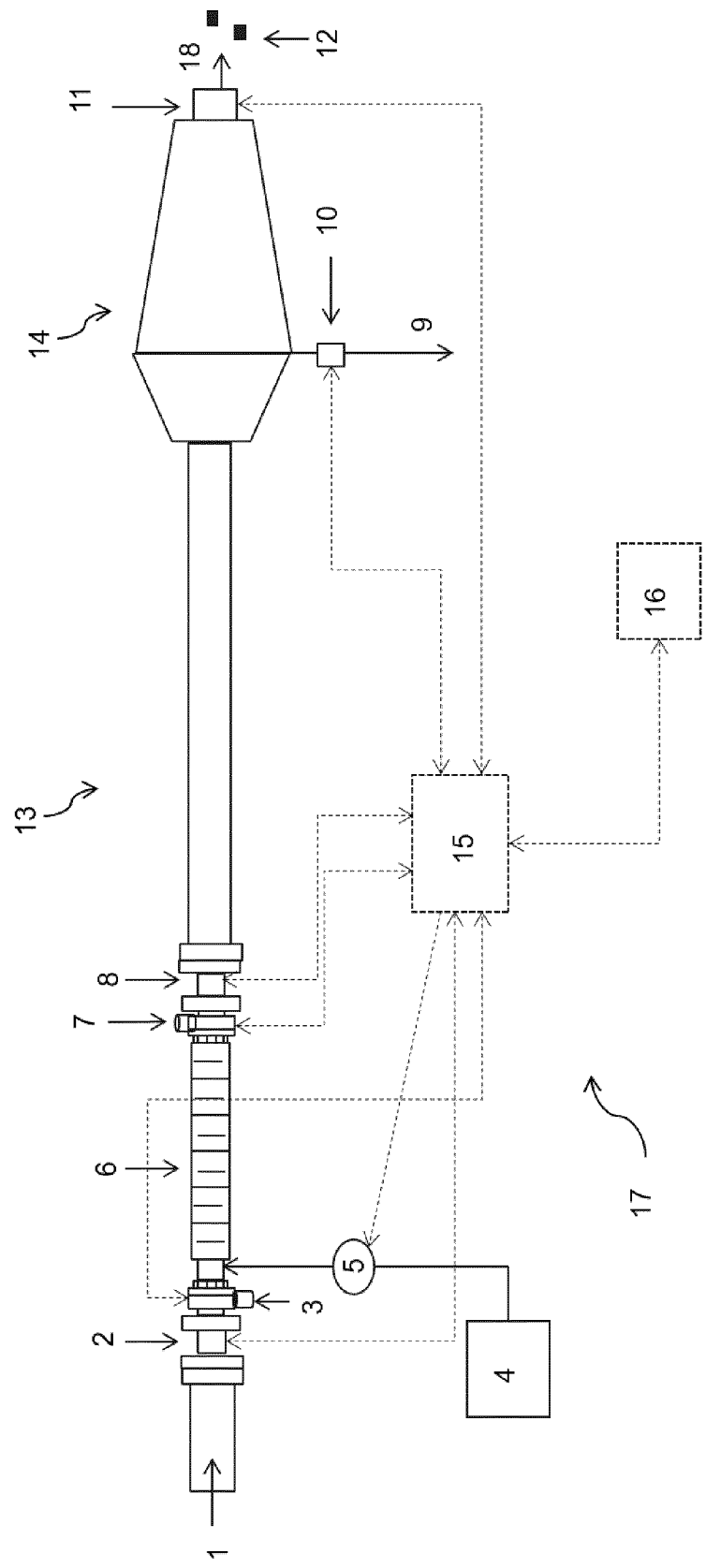

REAL-TIME DEWATERING OPTIMIZATION

FIELD OF THE INVENTION

The present invention relates to a system and method of monitoring and/or controlling dewatering or thickening processes in real-time.

TECHNICAL BACKGROUND

The use of dewatering processes in wastewater treatment is vast. As the degree of dewatering or thickening highly influences what the material can be used for as well as the costs for additional transportation and/or subsequent processing such as incineration or land fill. In order to reduce the costs and environmental impact on subsequent handling there is a need to provide improved process control to ensure a better end result.

Today different types of monitoring equipment are used to monitor and control dewatering processes. Measurements may e.g. be made on removed fluid phase from a separation device.

However, for an operator physically reading and analyzing a meter and then making adjustments based on the solids percentage have drawbacks. The solids percentage tests may take up to 30 minutes to perform. Then, if further measurements have to be made it takes even longer. This operation often misses the mark, because it is a post treatment. The incoming sludge properties may vary over the course of the day. Thus, a quick and continuous adjustment would be desirable.

There is a need to provide improved and simplified monitoring and/or controlling of dewatering or thickening processes.

SUMMARY OF THE INVENTION

The present invention provides an auto-optimization of chemicals which provides lower treatment costs in dewatering and thickening processes. This allows recording the exact amounts of chemicals used. In this manner costly excess additions are avoided. Also to low addition amounts are avoided, which may cause disruptions in the process as material may need further dewatering steps or be recycled to the dewatering step. A too low dewatering increases the costs for transport and deposition.

The present system also allows the dewatering/thickening operators to monitor their own system off-site remotely.

The present invention enables feedback in real-time based on untreated and treated levels of total solids percentages and total suspended solids percentages. Inorganic coagulants are effective on treating Total Dissolved Solids (TDS).

The present system may comprise ingoing wastewater or sludge in the wastewater piping. At the wastewater piping more than one total solids measurement device and more than one total suspended solids measurement device may be present. The total solids measurement devices may be positioned at the wastewater piping at a position before and/or after addition of an inorganic coagulant, optionally after a subsequent mixing step, but before a dewatering or thickening device; or after a dewatering or thickening device. If any device is positioned after the dewatering or thickening device, the total solids measurement device may be positioned at the outlet for concentrated wastewater and the total solids measurement device may be positioned at the fluid outlet for the removed fluid.

An inorganic coagulant container may be connected to a feeding valve which controls a flow of coagulant from said inorganic coagulant container to said wastewater piping.

The total solids measurement devices and total suspended solids measurement devices may be attached in any order, in relation to each other, at the wastewater piping. A mixing device may be present at the wastewater piping after the addition of the inorganic coagulant. After the optional mixing step the wastewater may be forwarded to the dewatering or thickening device, wherein the wastewater is dewatered or thickened and the fluid obtained in this separation process is removed from the dewatering or thickening device via a fluid outlet. Concentrated wastewater is also obtained from the dewatering or thickening device, e.g. in the form of a thickened wastewater slurry or a semi-dry or dry cake. The total solids measurement devices and the total suspended solids measurement devices may be connected to a control unit, which receives all measured data. The control unit may also be able to control the feeding valve which influences the flow of coagulant from the inorganic coagulant container to the wastewater piping. Additionally, another unit may be included in the system, a remote control unit, which also may be able to receive the collected data from the control unit, e.g. via a network. At least one of the control unit and remote control unit comprise a function able to convert the received data on total solids content and total suspended solids content to a total dissolved solids value and correlate with at least a predetermined set point total dissolved solids value (TDS1). The control unit and/or the remote control unit are able to process all data in an algorithm to compute an optimized inorganic dosage rate based on measured values and preset values. The control unit then provides input to the feeding valve for the dosing of coagulant to the wastewater in the piping. The total dissolved solids value and the correlation to the predetermined set point total dissolved solids value(s) may be displayed for a user either at the control unit or may be displayed for a user connected to the network via the remote control unit.

SHORT DESCRIPTION OF THE DRAWINGS

FIG. 1 discloses a schematic drawing of an embodiment of the system according to the present invention.

DETAILED DESCRIPTION

The present process and system may be used for treatment of wastewaters and/or sludges. Herein they may simply be referred to as "wastewater".

Dewatering and/or thickening processes may include a wastewater piping forwarding wastewater to a dewatering or thickening device and removing concentrated wastewater from said device. The removed concentrated wastewater may have many different appearances depending on how much fluid is removed from the wastewater, e.g. be slightly to highly thickened compared to the ingoing wastewater, but may also be as highly dewatered as possible becoming more of a dry cake-like shape. The dewatering or thickening processes according to the present invention relates to removing fluid from wastewater. Thickening process and the devices used therefore removes fluids, also other fluids than water. The apparatuses used for such purposes may be different, similar or the same. Herein the wordings dewatering and thickening are used herein and both relates to removal of fluids from wastewater. The wordings are not considered limiting in terms of a specific degree of dewatering, only that at least some fluid is removed and that may be to a higher or lower extent. The fluid separated in the process is removed via a fluid outlet of the dewatering or thickening device. On the ingoing wastewater piping different positions for addition of different additives may be provided before wastewater is entering the dewatering or thickening device. Also mixing device(s) may be provided at the wastewater piping before wastewater is entering the dewatering or thickening device. Mixing devices may be provided to improve the distribution of any added additives in the wastewater. The present invention relates to monitoring and/or controlling such dewatering or thickening processes. By monitoring the processes one may keep track of what is happening in the process. By additionally also controlling the processes one may influence the processes in different ways.

One aspect of the present invention relates to providing a system for real-time monitoring and/or controlling wastewater or sludge dewatering and/or thickening processes. The system may comprise
- a wastewater piping comprising a wastewater inlet and a concentrated wastewater outlet;
- at least one dewatering or thickening device, attached to said wastewater piping between the inlet and the outlet;
- at least one total solids measurement device, attached to said wastewater piping;
- a total suspended solids measurement device, attached to said wastewater piping before the at least one dewatering or thickening device;
- an inorganic coagulant container connected to said wastewater piping;
- a feeding valve to control a flow of inorganic coagulant from said inorganic coagulant container to said wastewater piping; and
- a control unit;

wherein the flow of inorganic coagulant is adapted to be controlled to uphold at least a predetermined set point value (TDS1) in relation to the value(s) measured by said total solids (TS) measurement device, and the value(s) measured by said total suspended solids (TSS) measurement device.

The flow of coagulant is controlled in relation to the value(s) measured by said total solids (TS) measurement device, the value(s) measured by said total suspended solids (TSS) measurement device, and the predetermined set point value (TDS1) stating a specified limit.

In one embodiment the at least one total solids measurement device and at least one total suspended solids measurement device are positioned in the vincinity of each other, such as adjacent to each other.

The wastewater piping is provided with a dewatering or thickening device. The wastewater going out of the dewatering or thickening device is more concentrated, i.e. have higher solids content, than the wastewater going into the dewatering or thickening device. Preferably the inorganic coagulant container is equipped with said feeding valve or is connected to the wastewater piping via a pipe equipped with said feeding valve. The feeding of the inorganic coagulant to the waste water preferably occurs prior to the dewatering or thickening device. Optionally polymers may be added before and/or after, or simultaneously with the inorganic coagulant addition. Inorganic coagulants may be used together or separately with a polymer to enhance the dry solids content of sludge by treatment of mostly dissolved solids.

In one embodiment the dewatering or thickening device have a fluid (flow) outlet, attached to said at least one dewatering or thickening device. The fluid outlet removes fluid separated from the wastewater in said dewatering or thickening device.

In one embodiment the dewatering or thickening device may be chosen from the group centrifugation device, filtration device, and sedimentation device; preferably centrifuge, gravity belt, filter press, or decanter.

In one embodiment the at least one total solids measurement device is attached to the wastewater piping before the point of providing the inorganic coagulant into the wastewater piping; or after the point of providing the inorganic coagulant into the wastewater piping but before the at least one dewatering or thickening device; or after the at least one dewatering or thickening device; or any combination thereof. The total solids content may be measured in the wastewater piping before the flow of inorganic coagulant into the wastewater piping; or may be measured after the point of providing the inorganic coagulant into the wastewater piping but before the at least one dewatering or thickening device; or may be measured after the at least one dewatering or thickening device; or any combination thereof.

In one embodiment the at least one total suspended solids measurement device is attached to the wastewater piping before the point of providing the inorganic coagulant into the wastewater piping; or after the point of providing the inorganic coagulant into the wastewater piping but before the at least one dewatering or thickening device; or after the at least one dewatering or thickening device; or any combination thereof. The total suspended solids content may be measured in the wastewater piping before the flow of inorganic coagulant into the wastewater piping; or may be measured after the point of providing the inorganic coagulant into the wastewater piping but before the at least one dewatering or thickening device; or may be measured after the at least one dewatering or thickening device; or any combination thereof. If the at least one total suspended solids measurement device is attached to the wastewater piping before the dewatering or thickening device it may be attached before and/or after the inorganic coagulant addition point, before and/or after an optional mixing device, and/or at the inlet to the dewatering or thickening device If the at least one total suspended solids measurement device is attached after the dewatering or thickening device it may be attached to the fluid outlet of the dewatering or thickening device. This means that the total suspended solids content may be measured in the fluid flow outlet of the dewatering or thickening device.

In one embodiment the at least one total solids measurement device measures microwave velocities through the wastewater.

In one embodiment the total suspended solids measurement device measures light absorption, scattering, and depolarization as two sources of light passes through the wastewater.

Total Solids (TS) levels in wastewater may be measured using an in-line microwave-based solids content transmitter. Total Suspended Solids (TSS) of the wastewater may be measured by another device that measures light adsorption. Both of those levels may be measured in real-time and utilized in an algorithm which in turn may be used to control inorganic coagulant dosing in dewatering and/or thickening processes.

The present system is designed to regulate the chemical dose rate applied to a waste stream for enhanced dewatering and/or thickening. The TSS measuring device may utilize two sources of light, which measure light adsorption, scattering, and depolarization as the light passes through the wastewater flow. Both the TS and TSS devices are able to collect data and forward it to a control unit, which may be a remote control unit, with an algorithm that automatically calculates a Total Dissolved Solids (TDS) level. TDS is calculated by subtracting the TSS values from the TS values. A signal may then be sent from the control unit to a feeding valve that can adjust an inorganic coagulant feed for optimized dewatering and/or thickening applications based on the TDS level. For example, the higher the TDS value is, the more inorganic coagulant fed to the wastewater flow. Some potential TDS targets for the inorganics to remove are phosphates and/or dissolved organic nitrogen.

A TS measurement device may be positioned directly in a high solids wastewater flow, where it constantly analyzes the mass balance of solids into and/or out of a dewatering or thickening operation. The TS measurement device may measure microwave velocities through the wastewater medium, i.e. may be a microwave based total solids analyzer. The velocity is based on the permittivity of the solids versus water. The device may measure Total Solids of about from 0 up to 40% by weight. The device(s) may be installed prior to and/or after a dewatering or thickening device; e.g. prior to and/or after an inorganic coagulant addition and/or polymer addition, after dewatering, or at any of the mentioned positions in combination.

A TSS measurement device may additionally be used which measured light adsorption, i.e. may be a light adsorption optical-based low solids analyzer. The TSS measurement device may be positioned before and/or after the dewatering or thickening device. The TSS measurement device may be positioned before or after the point of addition of inorganic coagulant of the wastewater piping. The TSS measurement device may be positioned in-line further downstream of the inorganic injection point on the waste water piping, preferably after mixing, and before the dewatering/thickening process. Alternatively or additionally, the TSS measurement device may be positioned after the dewatering/thickening process, e.g. at the fluid outlet where a fluid flow is removed from the dewatering or thickening device when the wastewater is concentrated in the dewatering or thickening device. Depending on the apparatus used this fluid may be called e.g. a centrate or filtrate. The device may measure Total Suspended Solids of about from 0 up to 50,000 mg/L (5%).

Both data points for TS and TSS are used to auto-calculate an inorganic coagulant dosage level based on an algorithm, TDS=TS-TSS.

The TS and TSS measurement devices may be positioned at a position in the vincinity of each other, e.g. close or adjacent to each other. The measurement of TS and TSS is preferably done at positions of the dewatering/thickening process in the vincinity of each other, e.g. close or adjacent to each other. If TS and TSS are measured at many positions of the dewatering/thickening process, TS and TSS measured in the vincinity of each other may be connected and used to calculate the TDS of that relative position. Thus, several TDS values may be obtained at different positions of the dewatering/thickening process. Also, if more than one device such as a dewatering and/or thickening device and/or mixing device etc. is used TS and TSS may be measured at different positions in releation to the several devices.

In one embodiment the control unit have a database, a file, a data processor for receiving data and converting the received data on total solids content and total suspended solids content to a total dissolved solids value and correlate with at least a predetermined set point total dissolved solids value (TDS1) and displaying for a user connected to the network. The predetermined set point or value for total dissolved solids (TDS1) may be a defined specific number or range.

In one embodiment the control unit is connected to a remote control unit via a network, the remote control unit having user interface capability, so that real time data of the dewatering and/or thickening processes may be transferred from the control unit to be displayed for a user being connected to the remote control unit via the network.

In one embodiment the remote control unit is located in a cloud-based computing environment.

In one embodiment the remote control unit is a virtual control unit.

In one embodiment the remote control unit have a database, a file, a data processor for receiving data and converting the received data on total solids content and total suspended solids content to a total dissolved solids value and correlate with at least a predetermined set point total dissolved solids value (TDS1) and displaying for a user connected to the network.

In one embodiment the control unit having user interface capability, so that real time data of the dewatering and/or thickening processes may be displayed for a user. The user may be connected to the control unit via the network.

The TS and TSS data may be provided via a local display. The TS and TSS data may be sent to a control unit with a database for analysis and processing in real time. Alternatively, the TS and TSS data may also be sent remotely, e.g. via General Packet Radio Services (GPRS), to a remote control unit with a database for analysis and processing in real time.

Additionally, after calculation of a TDS value and comparing with a predetermined value, e.g. a range, a data signal may be sent to a feeding valve controlling the flow of inorganic coagulant into the wastewater flow. The data signal may be sent via a 4-20 mA hard wire or profibus PA to a feeding valve.

The feeding valves may be equipped with separate magflow meters that automatically read the chemical feed output. This output may then be forwarded to the control unit. This may be used to track the targeted (calculated) dosage for accuracy.

One aspect of the present invention relates to providing method for real-time monitoring and/or controlling a wastewater or sludge dewatering and/or thickening process system according to the invention, said method comprising using the at least one total solids measurement device, providing real time, (preferably online) measurements of total solids content;

the total suspended solids measurement device, providing real time, (preferably online) measurements of total suspended solids content;

the control unit by means of:
receiving data on the total solids content measured in the wastewater piping;
receiving data on the total suspended solids content measured in the wastewater piping;
converting the received data on total solids content and total suspended solids content to a total dissolved solids value;
upholding at least a predetermined set point total dissolved solids value (TDS1) by controlling the flow of inorganic coagulant.

In one embodiment the total solids content is measured in the wastewater piping before the flow of inorganic coagulant into the wastewater piping; or after the at least one dewatering or thickening device; or a combination of both.

In one embodiment the total suspended solids content is measured after the flow of inorganic coagulant into the wastewater piping.

In one embodiment the control unit is connected to a remote control unit, having user interface capability, via a network, so that real time data of the dewatering and/or thickening processes may be transferred from the control unit and displayed for a user being connected to the remote control unit via the network.

In one embodiment the control unit have user interface capability, so that real time data of the dewatering and/or thickening processes may be displayed for a user. The user may be connected to the control unit via the network.

One aspect of the present invention relates to use of a system according to the present invention, for real-time monitoring and/or controlling a wastewater or sludge dewatering and/or thickening process.

FIG. 1 discloses an embodiment of the present invention. The present system 17 may comprise many features. Ingoing wastewater via an inlet 1 of the wastewater piping 13 may comprise a solids content of e.g. about 0-5% by weight. At the wastewater piping 13 more than one total solids measurement device 2, 8, 11 and more than one total suspended solids measurement device 3, 7, 10 may be present. A first total solids measurement device 2 may be positioned at the wastewater piping 13 at a position before addition of an inorganic coagulant. An inorganic coagulant container 4 may be connected to a feeding valve 5 which controls a flow of coagulant from said inorganic coagulant container 4 to said wastewater piping 13. A first total suspended solids measurement device 3 may be connected to the wastewater piping 13 before the addition of an inorganic coagulant. The first total solids measurement device 2 and first total suspended solids measurement device 3 may be attached in any order to the wastewater piping 13. A mixing device 6 may be present at the wastewater piping 13 after the addition of the inorganic coagulant. After the mixing step a second total solids measurement device 8 and a second total suspended solids measurement device 7 may be positioned. The second total solids measurement device 8 and second total suspended solids measurement device 7 may be attached in any order to the wastewater piping 13. Thereafter the wastewater may be forwarded to the dewatering or thickening device 14. In the device 14 the wastewater is dewatered or thickened and the fluid obtained in the separation process is removed from the dewatering or thickening device 14 via fluid outlet 9. At the fluid outlet 9 a third total suspended solids measurement device 10 may be attached. Concentrated wastewater 12 is also obtained from the dewatering or thickening device 14 via the concentrated wastewater outlet 18, e.g. in the form of a thickened wastewater slurry or a semi-dry or dry cake. The concentrated wastewater 12 may be measured using a third total solids measurement device 11. The total solids measurement devices 2, 8, 11 and the total suspended solids measurement devices 3, 7, 10 may be connected to a control unit 15, which receives all measured data. The control unit 15 may also be able to control the feeding valve 5 which influences the flow of coagulant from the inorganic coagulant container 4 to the wastewater piping 13. Additionally, another unit may be included in the system, a remote control unit 16, which also may be able to receive the collected data from the control unit 15, e.g. via a network. At least one of the control unit 15 and remote control unit 16 comprise a function able to convert the received data on total solids content and total suspended solids content to a total dissolved solids value and correlate with at least a predetermined set point total dissolved solids value (TDS1). The total dissolved solids value and the correlation to the predetermined set point total dissolved solids value(s) may be displayed for a user either at the control unit 15 or may be displayed for a user connected to the network via the remote control unit 16.

The invention claimed is:

1. A system for real-time monitoring and controlling wastewater or sludge dewatering or thickening processes, said system comprising:
    a wastewater piping comprising a wastewater inlet and a concentrated wastewater outlet;
    at least one dewatering or thickening device, attached to said wastewater piping between the wastewater inlet and the concentrated wastewater outlet;
    at least one real-time total solids measurement device, attached to said wastewater piping;
    at least one real-time total suspended solids measurement device, attached to said wastewater piping or a fluid outlet of the at least one dewatering or thickening device;
    an inorganic coagulant container connected to said wastewater piping at an inorganic coagulant container attachment point;
    a feeding valve to control a flow of inorganic coagulant from said inorganic coagulant container to said wastewater piping; and
    a control unit;
    wherein first one of the at least one real-time total solids measurement device and first one of the at least one real-time total suspended solids measurement device are positioned adjacent to each other in the wastewater piping to determine in real time, by measurements from the adjacently positioned first real-time total solids measurement device and first real-time total suspended solids measurement device, a first total dissolved solids value at a first location in the wastewater piping,
    wherein the flow of inorganic coagulant is adapted to be controlled in real time in relation to the first total dissolved solids value, so as to uphold at least a predetermined set point total dissolved solids value (TDS1).

2. The system according to claim 1, wherein said at least one dewatering or thickening device is chosen from the group consisting of centrifugation device, filtration device, and sedimentation device.

3. The system according to claim 1, wherein the first total solids measurement device is attached to the wastewater piping before the inorganic coagulant container attachment point to said wastewater piping providing the inorganic coagulant into the wastewater piping; or after the inorganic coagulant container attachment point to said wastewater piping providing the inorganic coagulant into the wastewater piping but before the at least one dewatering or thickening device; or after the at least one dewatering or thickening device; or any combination thereof.

4. The system according to claim 1, wherein the first total solids measurement device measures microwave velocities through the wastewater.

5. The system according to claim 1, wherein the at least one dewatering or thickening device have the fluid outlet, attached to said at least one dewatering or thickening device.

6. The system according to claim 1, wherein the first total suspended solids measurement device measures light absorption, scattering, and depolarization as two sources of light passes through the wastewater.

7. The system according to claim 1, wherein the at least one real-time total suspended solids measurement device
is attached to said wastewater piping before or after the inorganic coagulant container attachment point to said wastewater piping providing the inorganic coagulant into the wastewater piping; or
is attached to the fluid outlet of the at least one dewatering or thickening device; or a combination thereof.

8. The system according to claim 1, wherein the control unit have a database, a file, a data processor for receiving data and converting the received data on total solids content and total suspended solids content to the first total dissolved solids value and correlate with at least the predetermined set point total dissolved solids value (TDS1) and displaying for a user connected to a network.

9. The system according to claim 1, wherein the control unit is connected to a remote control unit via a network, the remote control unit having user interface capability, so that real time data of the dewatering and/or thickening processes may be transferred from the control unit to be displayed for a user being connected to the remote control unit via the network.

10. The system according to claim 9, wherein the remote control unit is located in a cloud-based computing environment.

11. The system according to claim 10, wherein the remote control unit is a virtual control unit.

12. The system according to claim 9, wherein the remote control unit have a database, a file, a data processor for receiving data and converting the received data on total solids content and total suspended solids content to the first total dissolved solids value and correlate with at least the predetermined set point total dissolved solids value (TDS1) and displaying for the user connected to the network.

13. The system according to claim 1, wherein the control unit having user interface capability, so that real time data of the dewatering and/or thickening processes may be displayed for a user being connected to the control unit via a network.

14. A method for real-time monitoring and/or controlling a wastewater or sludge dewatering or thickening process system according to claim 1, said method comprising using the control unit by means of:
receiving data on total solids content measured in the wastewater piping;
receiving data on total suspended solids content measured in the wastewater piping;
converting the received data on total solids content and total suspended solids content to the first total dissolved solids value;
upholding at least the predetermined set point total dissolved solids value (TDS1) by controlling the flow of inorganic coagulant.

15. The method according to claim 14, wherein said total solids content is measured in the first location in the wastewater piping before the flow of inorganic coagulant into the wastewater piping; or is measured in the first location after the inorganic coagulant container attachment point to said wastewater piping providing the inorganic coagulant into the wastewater piping but before the at least one dewatering or thickening device; or after the at least one dewatering or thickening device; or any combination thereof.

16. The method according to claim 14, wherein said total suspended solids content is measured at the wastewater piping before or after the flow of inorganic coagulant into the wastewater piping but before the at least one dewatering or thickening device; or is measured at the fluid outlet of the at least one dewatering or thickening device; or a combination thereof.

17. The method according to claim 14, wherein the control unit is connected to a remote control unit, having user interface capability, via a network, so that real time data of the dewatering and/or thickening processes may be transferred from the control unit and displayed for a user being connected to the remote control unit via the network.

18. The method according to claim 14, wherein the control unit have user interface capability, so that real time data of the dewatering and/or thickening processes may be displayed for a user being connected to the control unit via a network.

19. A method for real-time monitoring and/or controlling a wastewater or sludge dewatering or thickening process by using a system according to claim 1.

20. The system according to claim 1, wherein another one of the at least one real-time total solids measurement device and another one of the at least one real-time total suspended solids measurement device are positioned adjacent to each other in the wastewater piping to determine a second total dissolved solids value at a second location in the wastewater piping,
wherein the flow of inorganic coagulant is adapted to be controlled in real time in relation to the first and second total dissolved solids values, so as to uphold at least the predetermined set point total dissolved solids value (TDS1).

21. The system according to claim 20, wherein the first location in the wastewater piping is before where the inorganic coagulant container is connected to the wastewater piping, and the second location in the wastewater piping is after where the inorganic coagulant container is connected to the wastewater piping.

* * * * *